(12) United States Patent
Zaluzec et al.

(10) Patent No.: US 9,290,212 B2
(45) Date of Patent: Mar. 22, 2016

(54) CARBON FIBER PREPREG-WRAPPED BEAM STRUCTURES

(71) Applicant: Ford Global Technologies, LLC, Dearborn, MI (US)

(72) Inventors: Matthew John Zaluzec, Canton, MI (US); Fubang Wu, Troy, MI (US); Richard H. Wykoff, Commerce Township, MI (US); Mohammed Omar Faruque, Ann Arbor, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 13/902,692

(22) Filed: May 24, 2013

(65) Prior Publication Data

US 2014/0346811 A1 Nov. 27, 2014

(51) Int. Cl.
| | |
|---|---|
| B60J 7/00 | (2006.01) |
| B62D 29/00 | (2006.01) |
| B62D 29/04 | (2006.01) |
| B29C 70/30 | (2006.01) |
| B32B 1/08 | (2006.01) |
| B32B 5/12 | (2006.01) |
| B32B 15/14 | (2006.01) |
| B32B 5/02 | (2006.01) |
| B32B 5/26 | (2006.01) |
| B29L 31/30 | (2006.01) |

(52) U.S. Cl.
CPC .............. *B62D 29/005* (2013.01); *B29C 70/30* (2013.01); *B32B 1/08* (2013.01); *B32B 5/024* (2013.01); *B32B 5/12* (2013.01); *B32B 5/26* (2013.01); *B32B 15/14* (2013.01); *B62D 29/04* (2013.01); *B29L 2031/30* (2013.01); *B32B 2250/05* (2013.01); *B32B 2250/42* (2013.01); *B32B 2260/021* (2013.01); *B32B 2260/023* (2013.01); *B32B 2260/046* (2013.01); *B32B 2262/106* (2013.01); *B32B 2305/076* (2013.01); *B32B 2307/54* (2013.01); *B32B 2307/718* (2013.01); *B32B 2311/24* (2013.01); *B32B 2313/04* (2013.01); *B32B 2605/00* (2013.01)

(58) Field of Classification Search
CPC ..... C08L 2666/14; C08L 53/02; C08L 63/00; H01L 2924/00; H01L 2924/00014; H01L 2224/05655; B29C 66/7212; B29C 65/00; H05K 3/0035
USPC ............ 296/187.12; 156/187, 60, 242, 307.7, 156/330; 264/257, 258; 428/297.4, 408, 428/413
See application file for complete search history.

(56) References Cited

U.S. PATENT DOCUMENTS

| | | | | |
|---|---|---|---|---|
| 4,770,929 A | * | 9/1988 | Nobumasa et al. | 442/278 |
| 4,822,660 A | * | 4/1989 | Lipp | 428/113 |
| 5,100,713 A | * | 3/1992 | Homma et al. | 428/102 |
| 5,614,305 A | * | 3/1997 | Paine et al. | 428/301.1 |

(Continued)

FOREIGN PATENT DOCUMENTS

| | | | |
|---|---|---|---|
| DE | 102006058601 B4 | 4/2011 | |
| EP | 2465665 A1 | 6/2012 | |

*Primary Examiner* — Kiran B Patel
(74) *Attorney, Agent, or Firm* — Raymond Coppiellie; Brooks Kushman P.C.

(57) ABSTRACT

A beam sub-assembly for a vehicle includes a beam member and at least one carbon-fiber prepreg bonded to a first portion of an exterior surface of the beam member so as to cover an entire length of the beam member along the first portion.

10 Claims, 5 Drawing Sheets

(56) References Cited

U.S. PATENT DOCUMENTS

| | | | |
|---|---|---|---|
| 5,667,866 A * | 9/1997 | Reese, Jr. | 428/116 |
| 5,906,550 A * | 5/1999 | Kingston | 473/320 |
| 5,908,216 A | 6/1999 | Townsend | |
| 6,779,830 B2 | 8/2004 | Patberg et al. | |
| 7,037,865 B1 * | 5/2006 | Kimberly | 442/181 |
| 7,125,067 B2 | 10/2006 | Bonnett et al. | |
| 8,070,904 B2 | 12/2011 | Howe et al. | |
| 2002/0011047 A1 * | 1/2002 | Obeshaw | 52/794.1 |
| 2002/0062546 A1 * | 5/2002 | Obeshaw | 29/423 |
| 2002/0071920 A1 * | 6/2002 | Obeshaw | 428/34.1 |
| 2002/0160146 A1 * | 10/2002 | Homma et al. | 428/102 |
| 2002/0166595 A1 * | 11/2002 | Lindsay | 138/153 |
| 2003/0124287 A1 * | 7/2003 | Grosskrueger et al. | 428/36.91 |
| 2003/0184099 A1 * | 10/2003 | Van Damme et al. | 293/120 |
| 2005/0276530 A1 * | 12/2005 | Chen et al. | 384/536 |
| 2006/0024490 A1 * | 2/2006 | Werner et al. | 428/323 |
| 2006/0110599 A1 * | 5/2006 | Honma et al. | 428/413 |
| 2007/0269645 A1 * | 11/2007 | Raghavendran et al. | 428/292.1 |
| 2008/0063875 A1 * | 3/2008 | Robinson et al. | 428/426 |
| 2008/0187699 A1 * | 8/2008 | Sijpkes et al. | 428/36.3 |
| 2008/0210820 A1 * | 9/2008 | Kismarton et al. | 244/120 |
| 2009/0057948 A1 * | 3/2009 | Krogager et al. | 264/258 |
| 2009/0102092 A1 * | 4/2009 | Westerdahl et al. | 264/258 |
| 2009/0117366 A1 * | 5/2009 | Honma | 428/314.8 |
| 2009/0126860 A1 * | 5/2009 | Fanucci et al. | 156/181 |
| 2010/0062238 A1 * | 3/2010 | Doyle et al. | 428/295.1 |
| 2010/0080952 A1 * | 4/2010 | Suzuki et al. | 428/113 |
| 2010/0108812 A1 * | 5/2010 | Boursier et al. | 244/129.3 |
| 2010/0143661 A1 * | 6/2010 | Warrick | 428/174 |
| 2010/0260611 A1 * | 10/2010 | Rudling | 416/226 |
| 2010/0266833 A1 * | 10/2010 | Day et al. | 428/304.4 |
| 2011/0011975 A1 * | 1/2011 | Boursier et al. | 244/118.1 |
| 2011/0221093 A1 * | 9/2011 | Perrow et al. | 264/255 |
| 2012/0067515 A1 * | 3/2012 | Dahl et al. | 156/245 |
| 2012/0256445 A1 * | 10/2012 | Baccouche et al. | 296/193.06 |
| 2013/0069395 A1 * | 3/2013 | Nusier et al. | 296/203.03 |
| 2013/0069415 A1 * | 3/2013 | Yasuda et al. | 297/452.18 |
| 2013/0108824 A1 * | 5/2013 | Berger et al. | 428/113 |
| 2013/0115404 A1 * | 5/2013 | Goehlich et al. | 428/45 |
| 2013/0122763 A1 * | 5/2013 | Fish et al. | 442/59 |
| 2013/0209746 A1 * | 8/2013 | Reighley et al. | 428/172 |
| 2013/0291476 A1 * | 11/2013 | Broughton et al. | 52/653.2 |
| 2013/0344305 A1 * | 12/2013 | Hatanaka et al. | 428/206 |
| 2014/0127521 A1 * | 5/2014 | Ishibashi et al. | 428/474.7 |
| 2014/0150634 A1 * | 6/2014 | Liu et al. | 89/36.02 |
| 2014/0284855 A1 * | 9/2014 | Spiegel et al. | 267/41 |
| 2014/0367981 A1 * | 12/2014 | Zaluzec et al. | 293/121 |
| 2015/0056449 A1 * | 2/2015 | Broughton et al. | 428/376 |
| 2015/0061320 A1 * | 3/2015 | Yabu et al. | 296/187.1 |
| 2015/0064409 A1 * | 3/2015 | Takeuchi et al. | 428/164 |

* cited by examiner

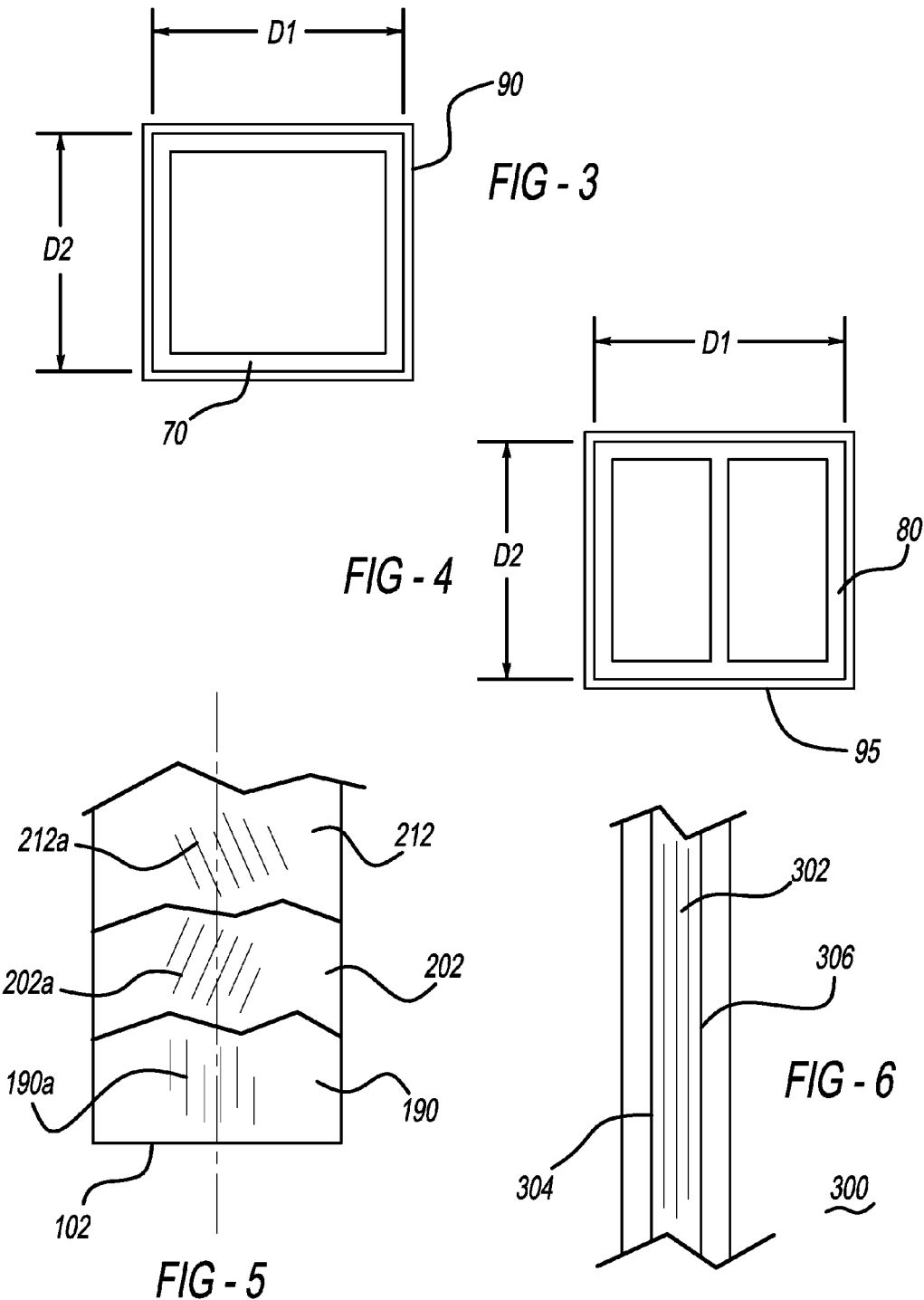

CARBON FIBER PREPREG-WRAPPED BEAM STRUCTURES

BACKGROUND OF THE INVENTION

There are ongoing and increasing demands for weight reduction in motor vehicles. One area of focus in this regard is the frame and overall structure of the vehicle. For example, it may be feasible to redesign certain elements of the vehicle structure so that these elements can be fabricated from relatively lighter materials (such as polymers or aluminum) instead of steel. However, certain elements of the vehicle must also have sufficient strength to satisfy collision test requirements.

One example of such an element is a side intrusion door beam incorporated into the structure of a vehicle door. Such beams must be strong and stiff enough to resist deformation due to a side impact, long enough for a side airbag to properly deploy between the door trim and a passenger seated next to the door. For this purpose, side door beams are formed from high-strength materials such as boron steel. In an effort to reduce overall vehicle weight, extruded aluminum tubes have been considered for use as door beams. However, extrusion grade aluminum alloys such as 6082 or 6061 have much lower moduli of elasticity and much lower strengths than boron steel for a given beam design. If the beam re-designed to provide the necessary strength and stiffness using an aluminum alloy, virtually no weight savings are realized from use of the aluminum alloy. In some instances, the weight of an aluminum door beam may actually be greater than the weight of a boron steel beam having equivalent performance.

Thus, a need exists for beam structures and other load bearing structures which meet performance requirements and which have lower weights than existing structures.

SUMMARY OF THE INVENTION

In one aspect of the embodiments described herein, a beam sub-assembly for a vehicle is provided. The beam sub-assembly includes a beam member and at least one carbon-fiber prepreg bonded to a first portion of an exterior surface of the beam member so as to cover an entire length of the beam member along the first portion.

In another aspect of the embodiments described herein, a beam sub-assembly for a vehicle is provided. The sub-assembly includes a beam member, a first uniaxial carbon-fiber prepreg bonded to an exterior surface of the beam member, and a second uniaxial prepreg bonded to an exterior surface of the first prepreg. A fiber orientation of the second prepreg is arranged at a non-zero angle with respect to a fiber orientation of the first prepreg.

In another aspect of the embodiments described herein, a beam sub-assembly for a vehicle is provided. The sub-assembly includes a beam member, at least one first carbon-fiber prepreg bonded to a first portion of an exterior surface of the beam member, and at least one second carbon-fiber prepreg separate from the at least one first prepreg and bonded to a second portion of the beam member exterior surface.

In another aspect of the embodiments described herein, a beam sub-assembly for a vehicle is provided. The sub-assembly includes a beam member having a length, at least one first carbon-fiber prepreg bonded to an exterior surface of the beam member so as to cover a first portion of the length, and at least one second carbon-fiber prepreg bonded to the exterior surface so as to cover a second portion of the length different from the first portion.

BRIEF DESCRIPTION OF THE DRAWINGS

FIG. 3 is an end view of a third embodiment of a beam sub-assembly formed from one or more carbon fiber prepregs bonded to a beam member substrate.

FIG. 4 is an end view of a fourth embodiment of a beam sub-assembly formed from one or more carbon fiber prepregs bonded to a beam member substrate.

FIG. 5 is a partial plan cross-sectional view of a fifth embodiment of a beam sub-assembly formed from one or more carbon fiber prepregs bonded to a beam member substrate.

FIG. 6 is a partial cross-sectional view of a laminate formed by capturing one or prepregs between a pair of metallic surfaces.

DETAILED DESCRIPTION

Figure 1A:
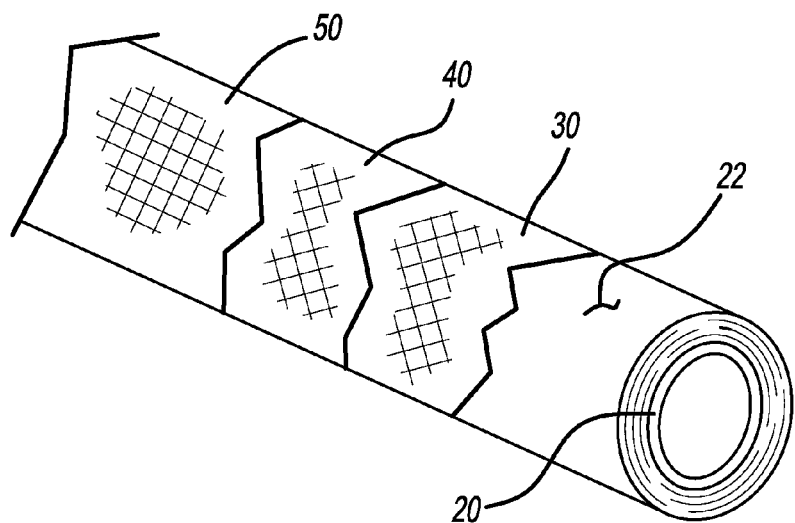
FIG. 1A is a perspective partial cross-sectional view of one embodiment of a beam sub-assembly formed from one or more carbon fiber prepregs bonded to a beam member substrate.

It has been found that the strength and stiffness of a beam member may be enhanced by wrapping a carbon fiber prepreg around a beam member and bonding the prepreg to the beam member. The strength and stiffness of the resulting sub-assembly can be further increased by successively or sequentially wrapping one or more additional prepreg layers around the previously bonded layer (or layers) and bonding each new layer to the existing structure. Each combination of a base beam member and a desired number of prepreg layers bonded thereto forms a beam sub-assembly.

It has also been found that a base beam member formed from a relatively lighter material (for example, aluminum) may be strengthened by bonding of carbon fiber prepregs thereto, to a point where the sub-assembly formed from the lighter-material beam member and attached prepregs has stiffness and strength comparable to those of a beam member formed from a stiffer, relatively heavier material (such as boron steel, for example.) In addition, the resulting sub-assembly has a lower weight than the beam member formed from the relatively heavier material.

As used herein, the term "beam structure" or "beam member" is understood to denote an elongated structure supported by or attached to at least one other member at at least one location along its length, and structured for bearing a load applied at a location spaced apart from any of its supports.

As used herein, the term "overall thickness" when applied to carbon-fiber prepregs refers to the total thickness of the prepreg layer (or layers, in the case of layers bonded successively on top of one another) covering a portion of a beam member.

As used herein, the term "stiffness" as applied to the beam structures and sub-assemblies described herein is understood to refer to the extent to which the beam structure or sub-assembly resists deformation responsive to an applied load.

As applied to the beam members described herein, the term "exterior surface" or "outer surface" refers to the exposed outermost surfaces of a beam member or prepreg, which may be readily accessed for application of the prepregs thereto. For example, in the box beam member structures shown in FIGS. 3 and 4, the exterior surfaces would be the surfaces defining the outermost extent or dimensions of the beam member (for example, dimensions D1 and D2) as seen from end views of the beam members. In the tubular beam member structure shown in FIGS. 1A and 1B, the exterior surface would be the surface 22 defining the outer diameter of the tube.

Various embodiments of the prepregs described herein may be bonded directly to associated exterior surfaces of the beam member (or portions thereof) by curing of the adhesive matrix in which the carbon fibers are encased. In this case, a portion of the matrix is bonded or attached directly to or in contact with the beam member exterior surface. Alternatively, one or more prepregs may be bonded indirectly to the beam member, by being bonded to other prepreg(s) which are attached directly to the exterior surface of the beam member.

As is known in the art, a carbon fiber prepreg is a layer of material formed from an aggregation of carbon fibers secured with respect to each other in a matrix of heat-activated epoxy or other adhesive formulated to bond the fibers to a metal surface or other substrate. Prepregs are available in which all of the carbon fibers in the prepreg are oriented predominantly along or parallel to a single axis. Such prepregs are commonly known as "unidirectional prepregs". Also, prepregs are available in which the fibers or bundles of fibers are woven into a fabric structure having interlaced or interlocking arrangement, with the prepreg fibers extending in two or more different directions within a single layer or sheet. In addition, the prepreg material may be in the form of a thin tape which may be wound around the beam member as desired. Any of these types of prepregs may be wrapped around a beam member and bonded to the beam member to form a sub-assembly as described herein. Generally, the entire exterior surface of the beam member will be covered with one or more prepreg layers, so that both supported portions of the beam sub-assembly (for example, the ends of the beam sub-assembly) and the unsupported portions which may be subject to loads are reinforced by application of the prepreg.

Prepregs usable for fabricating beam sub-assemblies in accordance with the embodiments described herein are commercially available from a variety of sources, including, for example, Toray Composites (America), Inc. of Tacoma, Wash.; Toho Tenax America, Inc. of Rockwood, Tenn.; Zoltek Corporation of St. Louis, Mo.; and SGL CARBON SE of Wiesbaden, Germany. Generally, the fibers in a given prepreg layer will have the same thicknesses or diameters, within the limits of fiber manufacturing tolerances.

In addition, it has been found that multiple prepreg layers having a combination of thicknesses may be successively applied the beam member exterior surfaces to build up the overall dimensions of the beam member sub-assembly to a value within a desired dimensional range desired. That is, either a single prepreg layer (by repeated wrapping around the beam member) or multiple prepreg layers having the same thickness or different thicknesses may be successively applied to the beam member to achieve a beam member sub-assembly having the desired overall dimensions.

Furthermore, in embodiments where multiple successive separate prepreg layers or sheets are bonded to the beam member, it has been found that the sheet thickness, fiber density, fiber diameter, fiber orientation, and other prepreg characteristics of each individual layer may be specified so as to impart a desired stiffness and strength to the final beam sub-assembly. Thus, to a degree, and within the allowable overall dimensions of the beam sub-assembly, the stiffness and strength of the beam sub-assembly may be adjusted or "tuned" to a large degree.

Figure 10A:
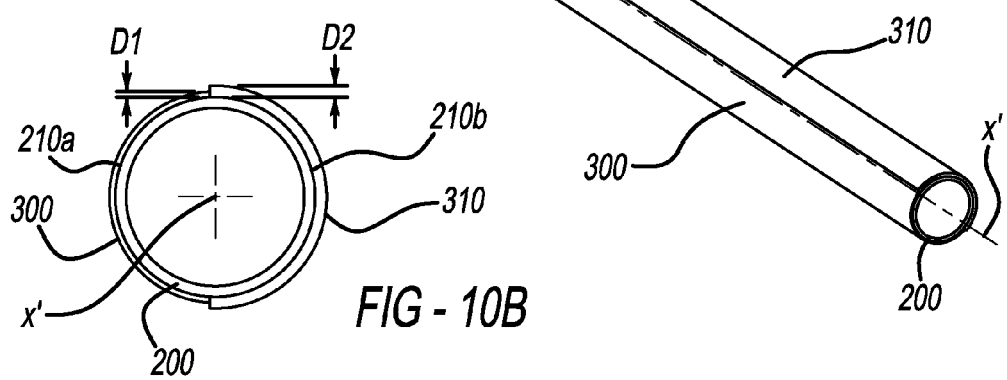
FIG. 10A is a perspective view of a fifth embodiment of a beam sub-assembly formed from one or more carbon fiber prepregs bonded to a beam member substrate.
Figure 10B:
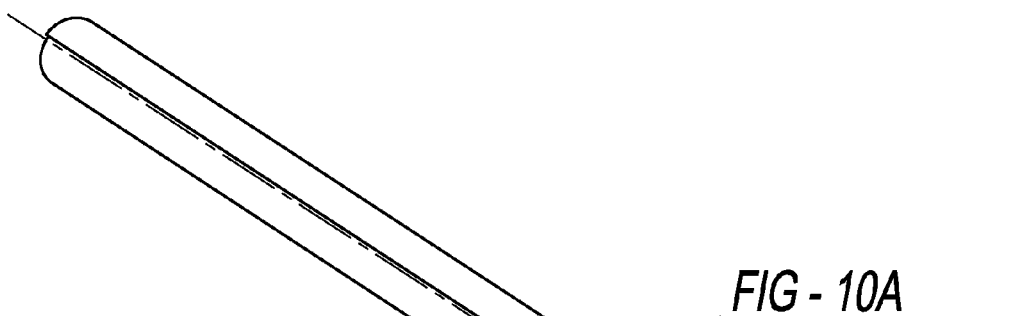
FIG. 10B is an end view of the embodiment shown in FIG. 10A.

In addition, different portions of the outer surface of a beam member may have separate prepregs of different thicknesses applied to each portion. FIGS. 10A and 10B show an embodiment where the beam member 200 has at least one first carbon-fiber prepreg 300 bonded to a first portion 210a of its exterior surface 210 so as to cover an entire length of the beam member only along the first portion 210a. Beam member 200 also has at least one second carbon-fiber prepreg 310 different from the at least one first prepreg 300 and bonded to a second portion 210b of beam member exterior surface 210 different from the first portion 210a to cover only the second portion 210b. At least one first prepreg 300 has a first overall thickness D1, and at least one second prepreg 310 has a second overall thickness D2. In the embodiment shown in FIGS. 10A and 10B, thickness D2 is greater than thickness D1. In a particular embodiment, single prepreg layers having overall thicknesses D2 and D1 are each applied along an entire length of the beam member exterior surface 210. Alternatively, one or more of prepregs 300 and 310 may be formed from multiple layers having different total overall thicknesses.

In the embodiment shown, the at least first and second prepregs 300 and 310 are in contact with each other. However, the prepregs may be positioned so as to not be in contact with each other, depending on the requirements of a particular application.

In a particular embodiment, the beam member 200 has a longitudinal axis and the at least one first prepreg 300 is a uniaxial prepreg having fibers oriented parallel to the longitudinal axis.

In another embodiment, the total thicknesses of the prepreg layers covering different portions of the beam member exterior surface are different, but the difference is created by applying multiple one or more layers successively to one or more of the beam member portions, such that the total thickness of prepreg applied to one portion of the beam member is greater than the total thickness of prepreg applied to the other portion of the beam member. Thus, for example, a single prepreg layer having a thickness T1 may be applied to a first portion of the beam member exterior surface, while two successive layers (each having a thickness of T2) are applied to a second portion of the beam member. The thicknesses of layers T1 and T2 may be specified such that 2T2>T1.

Figures 11A, 11B:
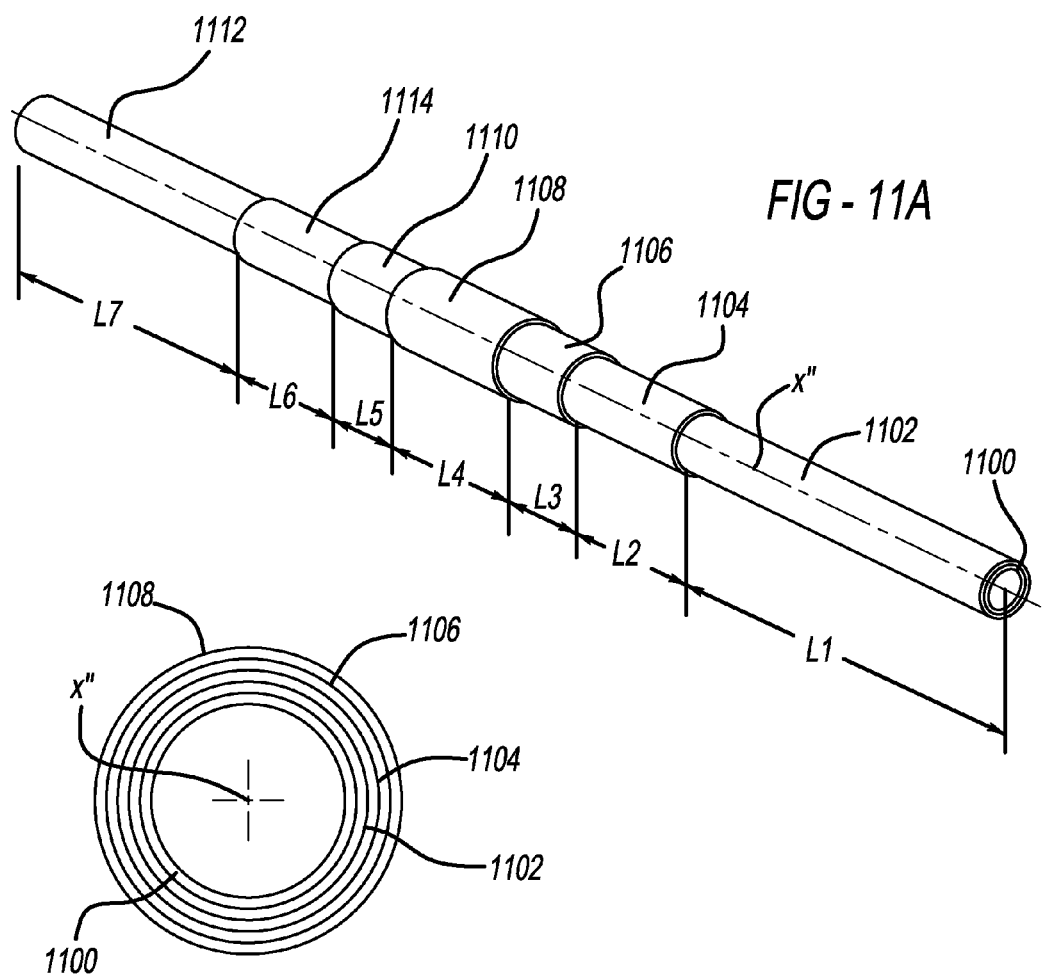
FIG. 11A is a perspective view of a sixth embodiment of a beam sub-assembly formed from one or more carbon fiber prepregs bonded to a beam member substrate.
FIG. 11B is an end view of the embodiment shown in FIG. 11A.

Referring to FIGS. 11A and 11B, in another particular embodiment, the overall thicknesses of the prepregs applied to the beam member exterior surface vary with the position of the prepreg(s) along the length of the beam member. FIGS. 11A and 11B show an embodiment where at least one first carbon-fiber prepreg 1102 is bonded to an exterior surface of the beam member so as to cover a first portion L1 of the total beam length, and at least one second carbon-fiber prepreg 1104 is bonded to the exterior surface so as to cover a second portion L2 of the total length different from the first portion L1. In the embodiment shown in FIGS. 11A and 11B, the at least one second prepreg 1104 is in contact with the at least one first prepreg 1102. However, the prepregs may be positioned so as to not be in contact with each other, depending on the requirements of a particular application.

In a particular embodiment, at least one of the first prepreg 1102 and the second prepreg 1104 is a woven prepreg.

In the embodiment shown in FIGS. 11A and 11B, the overall thickness of the layer(s) 1102 applied to a portion L1 of the beam member 1100 is T1. The overall thickness of the layer(s) 1104 applied to a portion L2 of the beam member is T2. The overall thickness of the layer(s) 1106 applied to a portion L3 of the beam member is T3. The overall thickness of the layer(s) 1108 applied to a portion L4 of the beam member is T4. The overall thickness of the layer(s) 1110 applied to a portion L5 of the beam member is T3. The overall thickness of the layer(s) 1112 applied to a portion L6 of the beam member is T2. The overall thickness of the layer(s) 1114 applied to a portion L7 of the beam member is T1. In the embodiment shown, T4>T3>T2>T1. However, the overall prepreg thicknesses along portions of the beam member length may be varied in any manner desired to provide the desired performance characteristics, according to the requirements of a particular application.

The larger overall thickness along any portion of the beam member length may be provided by applying a single, relatively thicker prepreg along that portion of the beam member, or the increased thickness may be provided by successively applying one or more additional layers to the beam member exterior surface or to a previous prepreg layer.

In another embodiment, one or more prepregs are applied to one or more portions of the beam member exterior surface, while one or more other portions of the exterior surface are left uncovered by prepregs. For example, in a particular embodiment, at least one prepreg covers only a portion of the beam member (in a manner similar to prepreg 310 covering beam member portion 210*b* in FIGS. 10A and 10B), while the remaining portion of the beam surface exterior is left uncovered. In this manner, prepregs having specific characteristics (such as the lengths of the prepregs, the overall thicknesses of the applied layer(s), the layer fiber orientations and other prepreg parameters) may be selectively applied to the beam member exterior surface so as to tailor the response of the beam sub-assembly to different force levels applied to different portions of the sub-assembly. This helps to minimize the size and weight of the beam sub-assembly for a given performance level, by applying a desired level of reinforcement to portions of the beam where it is needed most. For example, on a beam member that will be subjected to a bending load applied in a known region, a prepreg can be applied to a portion of the exterior surface opposite the side of the beam member to which the force is applied, to help mitigate tensile bending stresses in the covered portion of the beam member and to help avoid strain localization which may result in fracture of the beam member.

It has also been found that the stiffness and strength of the base member responsive to an estimated magnitude and/or direction of loading may be enhanced by orienting the fiber directions of the prepregs in one or more particular directions with respect to an axis passing through the base member. Thus, in certain embodiments, one or more prepregs are bonded to the beam member such that all of the carbon fibers in the attached prepregs are oriented predominantly along or parallel to a single axis. The estimated directions, magnitudes and distributions of the forces and moments to which a given the beam sub-assembly will be subjected may be determined experimentally and/or analytically using any of a variety of known methods. When these estimated forces and moments have been determined, one or more layers of the prepregs can be bonded to suitable exterior surfaces of the beam member so as to improve the stiffness or bending strength of the member under load, or to otherwise aid in strengthening the beam member against any projected deformation and/or damage responsive to the applied loading. The fiber orientations of the prepregs are arranged so as to increase the strength and or stiffness of the base member, or to otherwise optimize or improve the response of the base member to a given loading regime. Thus, the mechanical properties of the beam sub-assembly (i.e., the base member plus all attached prepregs) may be optimized to achieve a desired response to forces and/or moments acting in one or more selected directions, or to effect a general improvement of the mechanical properties of the base member to forces and/or moments acting on the base member sub-assembly in any direction.

Figure 1B:
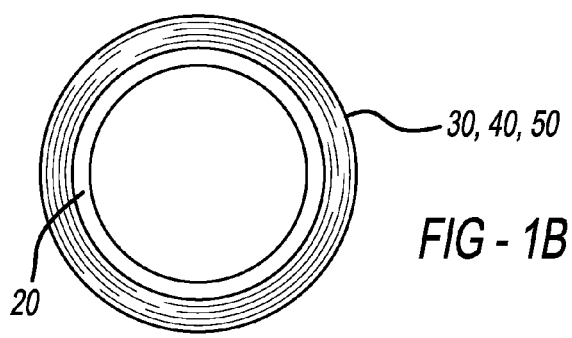
FIG. 1B is an end view of the sub-assembly shown in FIG. 1A.

FIGS. 1A and 1B show one embodiment of a vehicle beam member 20 which may be stiffened by bonding of one or more layers of carbon fiber (CF) prepregs to exterior surface(s) of the member 20. The beam member 20 thus serves as a relatively ductile substrate to which the reinforcing prepreg layers are applied. The bonded prepreg layers then stiffen the substrate against applied loading. Substrate or beam member materials usable in embodiments of the beam sub-assembly described herein include aluminum alloys (especially extrusion grade alloys such as 6082 and 6061), steels, and other metallic materials.

Beam member 20 may be formed from steel, aluminum or any suitable material and may be subject to bending, tension and/or torsional stresses, for example, when incorporated into a finished vehicle and/or during operation of the vehicle. In the embodiment shown in FIGS. 1A and 1B, beam member 20 is in the form of an extruded 6080 alloy aluminum tube having walls 2 millimeters (mm) thick. The base beam member 20 in FIGS. 1A and 1B is wrapped in three successively applied layers 30, 40, 50 of carbon fiber prepreg. Prepreg layer 30 is wrapped around and bonded to the exterior surface of the beam member 20. Prepreg layer 40 is then wrapped around and bonded to the exterior surface of prepreg layer 30. Prepreg layer 50 is the wrapped around and bonded to the exterior surface of prepreg layer 50. Each of prepregs 30, 40 and 50 is 0.15 mm thick.

Although the beam sub-assembly shown in FIGS. 1A and 1B is formed by the application of three successive prepreg layers to the base beam member, a sub-assembly may be formed by bonding either a lesser or a greater number of prepregs to the beam member, according to the requirements of a particular application. In the embodiment shown in FIGS. 1A and 1B, three layers 30, 40 and 50 of woven prepregs are successively bonded to the beam member 20 to form the beam sub-assembly. In a particular embodiment, layer 30 is 2×2 twill weave prepreg, layer 40 is a plain weave prepreg, and layer 50 is 2×2 twill weave 12K prepreg. However, if desired, successively applied layers of uniaxial prepreg may used. In addition, any suitable combination of uniaxial and woven prepregs may be used to form a beam sub-assembly, depending on the requirements of a particular application.

The prepregs 30, 40, 50 may be bonded to the surfaces of the beam member 20 using the epoxy or other adhesive forming part of the prepreg. The adhesives may be cured in a suitable oven or autoclave to bond the prepreg to the base member surface or to another prepreg layer previously applied to a base member surface. Prepregs in accordance with the embodiments described herein are generally tacky at room temperature. This allows the prepregs to adhere to the base member when positioned thereon prior to curing of the adhesive forming the matrix in which the carbon fibers are encased.

Although the embodiment in FIGS. 1A and 1B shows a beam member formed from a cylindrical aluminum tube, it has been found that the prepregs may be wrapped around and bonded to beam members having any of a variety of other shapes. For example, FIGS. 3 and 4 show single-cell box beam (FIG. 3) and dual-cell box beam (FIG. 4) members 70 and 80, respectively. Beam member 70 has one or more prepreg layers 90 wrapped around and bonded to its exterior surfaces, and beam member 80 has one or more prepreg layers 95 wrapped around and bonded to its exterior surfaces. These beam members may have bonded thereto any of the various types of prepregs or combinations thereof described herein. In addition, the various prepregs and arrangements thereof descried herein may be bonded to any of a variety of other suitable beam member structures, according to the requirements of a particular application.

Figure 2:
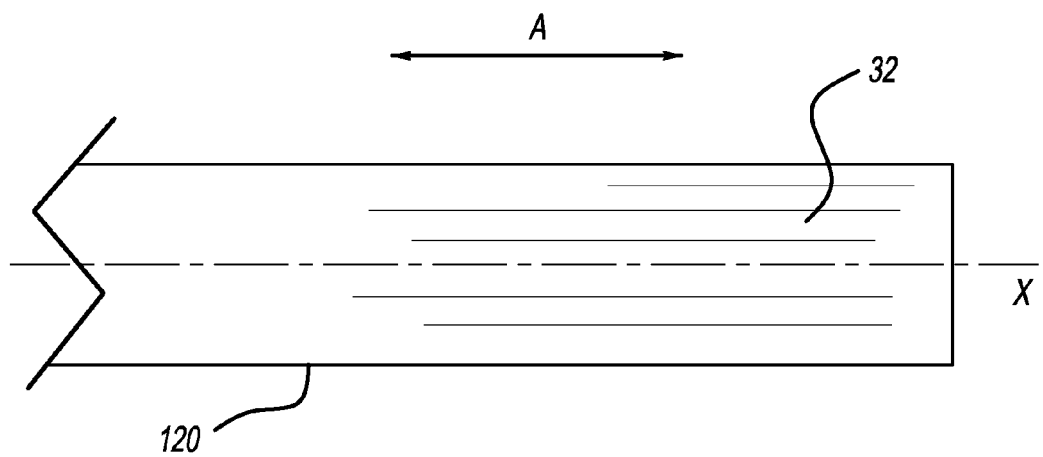
FIG. 2 is a partial plan view of a second embodiment of a beam sub-assembly formed from one or more carbon fiber prepregs bonded to a beam member substrate.

FIG. 2 shows an embodiment in which a single uniaxial prepreg 32 is wrapped around and bonded to a tubular beam member 120 such that the fiber orientation direction is indicated by arrow A. In this embodiment, the fiber orientation direction extends parallel with a longitudinal axis X of the beam member. This configuration provides maximum stiffening of the beam member responsive to a transverse load (i.e., a load applied along a line at or near a right angle to axis X) applied to the beam sub-assembly. One application of such a structure is in a door beam of a vehicle. Such a beam may be subjected to a side impact on the vehicle. However, the fiber orientation of any prepreg layer may be arranged at any desired angle with respect to a longitudinal or other axis defined with respect to the base member to which the prepreg is applied.

In a particular embodiment, a single unidirectional prepreg layer is wrapped repeatedly around the base member exterior to provide multiple prepreg layers covering the exterior surfaces of the base member, with the prepreg fibers extending along and/or parallel to a longitudinal axis of the base member in the manner shown in FIG. 2. In another embodiment, multiple layers are provided by wrapping multiple successive separate sheets of prepreg around the base member such that the fiber orientation in each uniaxial prepreg is aligned along or parallel to the same axis, as shown in FIG. 2. Where separate layers are wrapped around the base member, each successive layer may be applied and cured separately.

In other embodiments, the prepregs are incorporated into the sub-assembly such that the fiber orientation in each successive uniaxial prepreg is arranged at an angle with respect to the fiber orientation of the uniaxial prepreg in an adjacent layer to which it is bonded. For example, in the embodiment shown in FIG. 5, prepreg 190 (having a fiber orientation 190a) is applied directly to an exterior surface of the beam member 102, while another uniaxial prepreg 202 (having a fiber orientation 202a) is bonded to prepreg layer 190. In addition, the uniaxial prepreg layer 202 (having a fiber orientation 202a) is applied to prepreg layer 190 such that the fiber orientation 202a of layer 202 is at an angle with respect to the fiber orientation 190a of layer 190. In the embodiment shown in FIG. 5, the fiber orientation of layer 190 extends along or parallel to base member longitudinal axis X, and fiber orientations 202a and 212a of layers 202 and 212 are each arranged at an angle of 30 degrees with respect to the orientation of prepreg layer 190. Other common fiber directions with respect to a defined base member axis (or with respect to the fiber orientation of an adjacent prepreg) are 0, 45, 60 and 90 degrees. However, the fiber orientations of successive prepreg layers may be arranged at any desired angle or angles with respect to each other, in order to achieve the desired mechanical properties of the base member sub-assembly.

The time required to cure the prepreg adhesive will depend upon the adhesive chemistry and the curing environment. In a particular embodiment, a commercially available prepreg with an epoxy matrix is used. This epoxy can be cured in an oven with temperature in the range of 200° C.-300° C. in about 30 minutes. The curing process can be accelerated by using an autoclave where both elevated pressure and temperature can be applied to the sub-assembly.

In embodiments where multiple layers are applied to one or more surfaces of the base member, a first layer (or layers) are applied and bonded by application of heat or heat and pressure (for example, in an autoclave) to the metal surfaces of the beam member. After these initial layer(s) are bonded to the metal surfaces and cooled, additional layers may be applied over and bonded to the initial layers in the same manner.

In particular embodiments, prior to application of the prepreg to a surface of a metallic beam member, the surface is cleaned or otherwise treated to improve bonding between the prepreg and the metallic surface. For example, a stamped or formed beam member may be washed to remove oils and metal filings prior to application of the prepreg. Known pretreatment operations such as de-greasing, light grit blasting, mechanical roughening, and/or chemical etching may be applied to the metal surface to enhance the adhesive bond between the prepreg and the metal surface.

In particular embodiments, prior to application of the prepreg to a surface of a metallic beam member, a layer of zinc is applied to the surface. The zinc layer may be deposited on the surface using any known method, for example, plating or galvanizing. The zinc layer provides a degree of texturing to the base member surface. This texturing may facilitate bonding of the fibers to the base member surface during curing.

In addition, where separate prepreg layers are wrapped around the base member, the various layers may have the same or different prepreg sheet thicknesses, fiber thicknesses, densities, or other fiber characteristics from one or more other prepreg layers applied to the base member. Thus, different fiber orientations with respect to a base member axis as previously described may be provided by wrapping successive separate prepreg sheets or layers with different fiber orientations around the base member exterior. The fiber orientations of successive prepreg layers may be arranged at any desired angle or angles with respect to each other. Also the fiber orientation of any prepreg layer may be arranged at any desired angle with respect to a longitudinal or other axis defined with respect to the base member to which the prepreg is applied.

Factors affecting the selection of a prepreg or combination of prepregs include desired cure time, the substrate material(s) to which the prepregs are to be bonded, maximum allowable overall dimensions or envelope size of the beam sub-assembly, the stiffness and/or other mechanical property requirements for the beam assembly, and other pertinent factors. The use of prepregs incorporating both relatively lower modulus and relatively higher modulus carbon fibers is contemplated. For example, prepregs incorporating carbon fibers having a tensile modulus anywhere within the range of 40-400 GPa may be used. Prepregs having GSM (grams per square meter, or g/m$^2$) numbers in the range of 3K-48K are also contemplated.

Referring to FIG. 6, in another application, a vehicle component 300 is formed from one or more layers 302 of prepreg are captured between a pair of metallic surfaces 304 and 306, thereby forming a laminate 310. Surfaces 304 and 306 may be parts of separate elements or parts of the same element which are folded or otherwise formed so as to capture or enclose the prepreg layer or layers. Surfaces 304 and 306 may be secured in position with respect to each other using welds, mechanical fasteners, or any other suitable method, for purposes of securing the prepreg layer(s) therebetween. Securing the prepreg layer or layers between the metal surfaces prior to bonding can minimize or eliminate the need for surface cleaning of preparation prior to bonding. The captured and bonded prepreg(s) act to stiffen the structural element into which they are incorporated. Applications of such a laminate include a B-pillar of a vehicle, a side body panel of a vehicle, or any other application in which one or more prepregs can be captured between two metal surfaces.

Generally, when prepregs are adhered to the exterior surfaces of the beam member, the epoxy or bonding material in which the carbon fibers are encased, and which serves to attach the prepreg to the beam member, will provide an insulating layer or barrier between the carbon fibers and the metallic beam member surfaces. This acts to prevent galvanic corrosion of the metal surface. In cases where the barrier provided by the bonding material is insufficient, a layer of glass fiber may be applied to the metallic surfaces prior to attaching the prepregs to the surfaces. One possible source for high modulus and high strength glass suitable for such an application is Corning Incorporated of Corning, N.Y.

EXAMPLES

Figure 7:
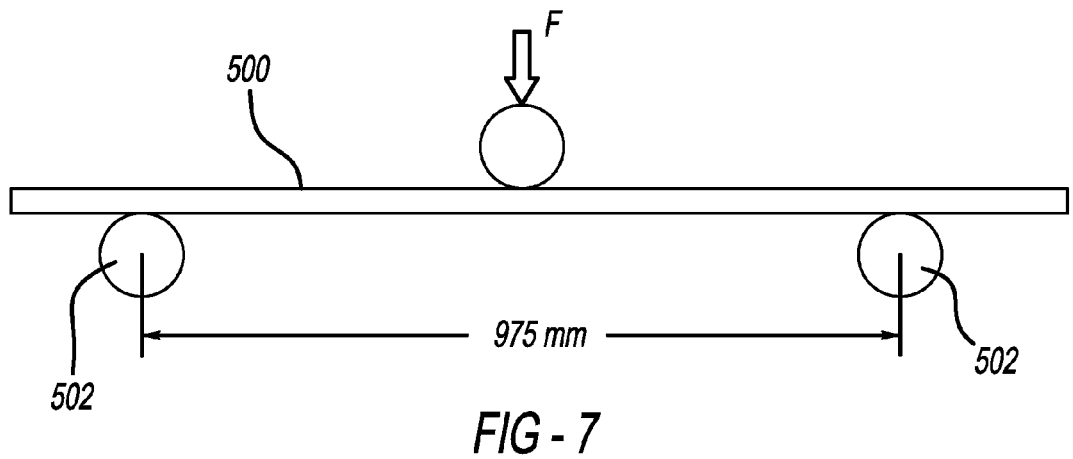
FIG. 7 is a schematic view of a test apparatus used to measure force-deflection performance of various beam sub-assemblies described herein.

To evaluate the relative stiffnesses and strengths of various alternative door beam embodiments, a test arrangement as shown in FIG. 7 was used. Various embodiments of the door beam (generally designated 500) were supported by a pair of supports 502 spaced apart a distance of 975 mm. A test load F was applied at a midpoint between the two supports.

Figure 8:
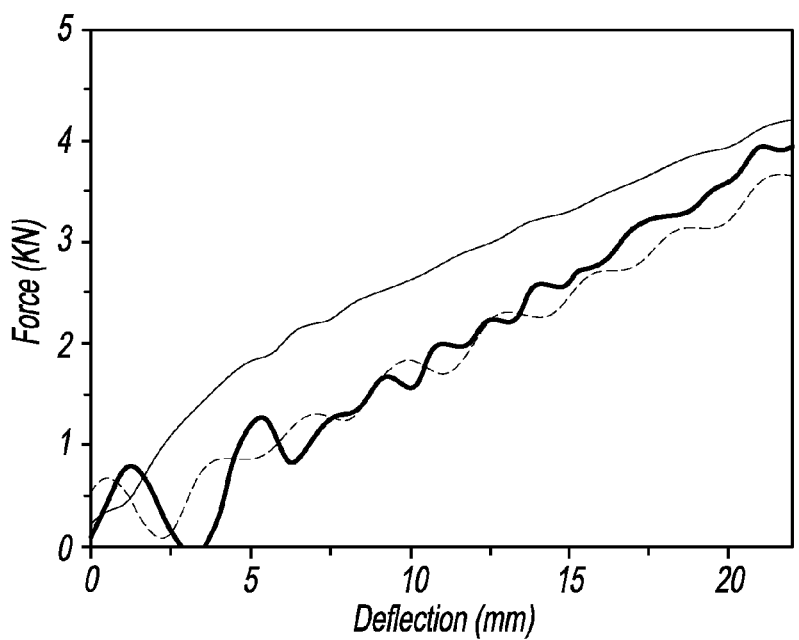
FIG. 8 is a graphical representation of force-deflection performance of one embodiment of a beam sub-assembly formed from one or more carbon fiber prepregs bonded to a beam member substrate.

Referring to FIG. 8, in one embodiment of the prepreg-wrapped door beam sub-assembly, a beam member was formed using a tube of 6061 T6 aluminum tube having a diameter of 25 mm and a wall thickness of 2 mm. Eight successive layers or sheets of 0/90 degree fiber composite prepreg (wherein each layer is formed from a series of alternating 0° and 90° plies) were bonded to the beam member, each layer or sheet having a thickness of 0.15 mm. Thus, the total thickness of prepreg bonded to the exterior surface of the aluminum tube was 1.2 mm.

In addition, baseline steel beam structures for comparison with the prepreg-wrapped beam member comprised a boron steel tube having a diameter of 25 mm and a wall thickness of 1.5 mm, and an aluminum tube of alloy 6061 T6 having a diameter of 25 mm and a wall thickness of 4.5 mm. For purposes of the comparison, the aluminum beam design was structured so as to have a force-deflection performance comparable to that of the boron steel beam. Force-deflection curves for each of the three beams are shown in FIG. 8.

It may be seen from the graph that the beam member/prepreg sub-assembly exhibited a stiffness superior to or comparable to either of the baseline beam structures. In addition, the weight of the boron steel beam was 1.64 kg and the weight of the aluminum beam (having a performance equivalent to the steel beam) was 1.69 kg. However, the weight of the prepreg/aluminum beam sub-assembly was only 1.02 kg. Thus, the prepreg/aluminum beam sub-assembly provided a stiffness at least comparable to those of the baseline beam structures, and at a weight savings of approximately 38%.

Figure 9:
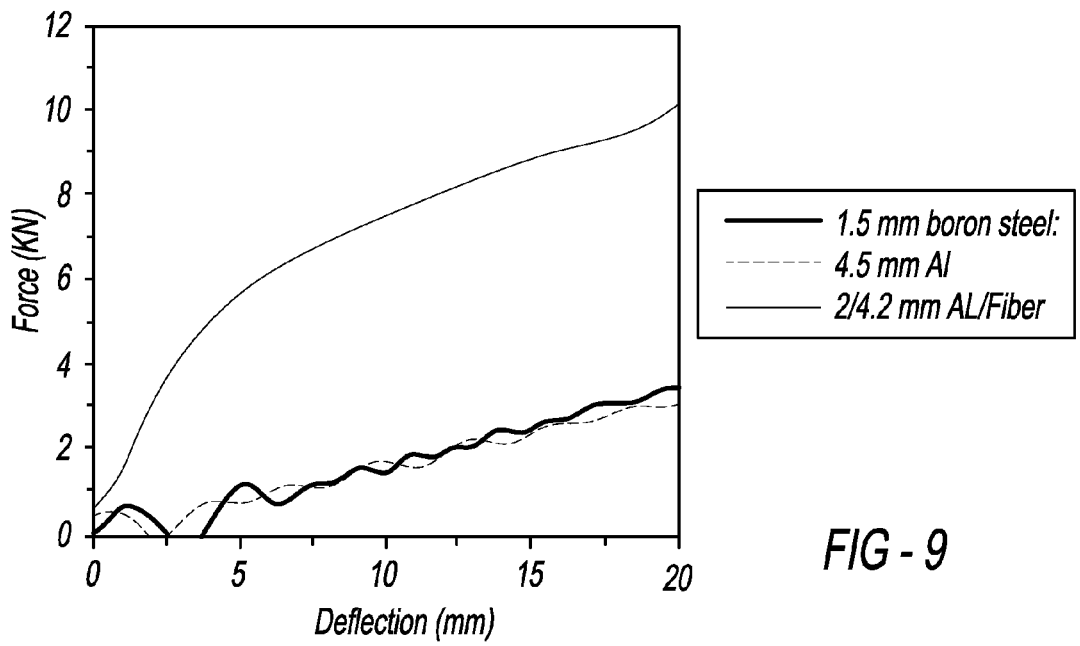
FIG. 9 is a graphical representation of force-deflection performance of another embodiment of a beam sub-assembly formed from one or more carbon fiber prepregs bonded to a beam member substrate.

Referring to FIG. 9, in an example of how the stiffness of a given weight of beam structure may be increased by the use of prepregs as described herein, steel and aluminum baseline beam structures having approximately the same weights were fabricated. In addition, a test prepreg/aluminum beam sub-assembly was constructed using a tube of 6061 T6 aluminum tube having a diameter of 25 mm and a wall thickness of 2 mm, as in the previous experiment. Successive layers or sheets of 0/90 degree fiber composite prepreg (wherein each layer is formed from a series of alternating 0° and 90° plies) were bonded to the beam member, each layer or sheet having a thickness of 0.15 mm, until a sub-assembly having a weight approximately equal to the weights of the baseline beam structures was produced. This involved the bonding of twenty-eight successive layers of the prepreg to the aluminum beam member. Thus, the total thickness of prepreg bonded to the exterior surface of the aluminum tube was 4.2 mm. As seen from the force-deflection curves shown in FIG. 9, the stiffness of a prepreg/aluminum beam sub-assembly having the same weight as the baseline beam structures was far superior to the stiffnesses of the baseline beam structures, the stiffness of the prepreg/aluminum beam sub-assembly showing an increase of approximately 400% over the stiffnesses of the baseline structures.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A beam sub-assembly for a vehicle, the sub-assembly comprising:
    a central beam member; and
    at least one first prepreg bonded only to a first portion of an exterior surface of the beam member and not bonded to a second portion of the exterior surface of the beam member, the at least one first prepreg covering an entire length of the beam member along the first portion.

2. The sub-assembly of claim 1 further comprising at least one second prepreg different from the at least one first prepreg and bonded only to the second portion of the exterior surface of the beam member different from the first portion.

3. The sub-assembly of claim 2 wherein the at least one second prepreg is bonded to the second portion of the exterior surface so as to cover an entire length of the beam member along the second portion.

4. The sub-assembly of claim 2 wherein an overall thickness of the at least one second prepreg is different from an overall thickness of the least one first prepreg.

5. The sub-assembly of claim 2 wherein the at least one second prepreg is in contact with the at least one first prepreg.

6. The sub-assembly of claim 1 wherein the beam member is an elongated beam member having a longitudinal axis, and wherein the at least one first prepreg is a uniaxial prepreg having fibers oriented parallel to the longitudinal axis.

7. A vehicle including a including a beam sub-assembly in accordance with claim 1.

8. A beam sub-assembly for a vehicle, the sub-assembly comprising:
a central beam member having a longitudinal axis; and
a first uniaxial prepreg directly bonded to a first portion of an exterior surface of the beam member along an entire length of the beam member and not bonded to a second portion of the exterior surface of the beam member, an orientation direction of the fibers in the first prepreg extending parallel with the longitudinal axis.

9. The sub-assembly of claim 8 further comprising a second uniaxial prepreg bonded to an exterior surface of the first prepreg, and wherein a fiber orientation of the second prepreg is arranged at a non-zero angle with respect to the fiber orientation of the first prepreg.

10. A vehicle including a beam sub-assembly in accordance with claim 8.

\* \* \* \* \*